United States Patent
Sugiura et al.

(10) Patent No.: US 6,823,827 B2
(45) Date of Patent: Nov. 30, 2004

(54) CONTROL APPARATUS OF INTERNAL COMBUSTION ENGINE AND METHOD THEREOF

(75) Inventors: Masanori Sugiura, Toyota (JP); Hiroshi Tsujii, Mishima (JP); Ken Kuretake, Mishima (JP); Hideto Hanada, Yokohama (JP); Takashi Kawai, Susono (JP); Tomohiro Kaneko, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/216,433

(22) Filed: Aug. 12, 2002

(65) Prior Publication Data

US 2003/0041830 A1 Mar. 6, 2003

(30) Foreign Application Priority Data

Aug. 29, 2001 (JP) ........................................ 2001-260321

(51) Int. Cl.[7] .............................................. F02N 11/08
(52) U.S. Cl. ................................................... 123/179.4
(58) Field of Search ..................... 123/179.4; 701/112

(56) References Cited

U.S. PATENT DOCUMENTS

| | | | | |
|---|---|---|---|---|
| 4,286,683 A | * | 9/1981 | Zeigner et al. | 180/54.1 |
| 5,826,671 A | * | 10/1998 | Nakae et al. | 123/179.4 |
| 6,275,759 B1 | * | 8/2001 | Nakajima et al. | 123/179.4 |

FOREIGN PATENT DOCUMENTS

| | | |
|---|---|---|
| JP | 9-60539 | 3/1997 |
| JP | A 2001-88580 | 4/2001 |

* cited by examiner

*Primary Examiner*—Andrew M. Dolinar
(74) *Attorney, Agent, or Firm*—Oliff & Berridge, PLC

(57) ABSTRACT

A control apparatus and method of an internal combustion engine performs a predetermined stop control of the engine that includes a control to stop the supply of fuel to the engine upon establishment of a predetermined stop condition, and a re-start control that includes a control to restart the supply of fuel to the engine in response to the establishment of a predetermined re-start condition. The apparatus has a stop control discontinuing device for discontinuing the stop control if the re-start condition is established within a predetermined period between establishment of the stop condition and a stop of the engine.

28 Claims, 11 Drawing Sheets

CONTROL APPARATUS OF INTERNAL COMBUSTION ENGINE AND METHOD THEREOF

INCORPORATION BY REFERENCE

The disclosure of Japanese Patent Application No. 2001-260321 filed on Aug. 29, 2001 including the specification, drawings and abstract is incorporated herein by reference in its entirety.

BACKGROUND OF THE INVENTION

1. Field of Invention

The invention relates to a control apparatus that automatically stops or starts an internal combustion engine, for example, a diesel engine, a gasoline engine and the like when a predetermined condition is established.

2. Description of Related Art

In consideration of a recent trend requiring reduced exhaust gas emission and improved fuel economy, it is recommendable to stop an engine of a vehicle rather than idle the engine when the engine is temporarily stopped. In such a case, a driver is required to stop and re-start the engine by manually operating a main switch or an ignition switch. However, the driver does not always implement the aforementioned operation for the stop and re-start of the engine. Technology has been developed for controlling the engine so as to be automatically stopped and re-started. This technology is a so-called economy running control or an eco-run control.

The exemplary eco-run control system is disclosed in JP-A-2001-88580. The disclosed system is designed to automatically stop and re-start an engine in a shifting state where torque is generated on an output shaft of a transmission by setting the shift lever at a drive range, such as a D-position. More specifically, a command to stop fuel supply to the engine is issued upon establishment of an engine stop condition. The engine stop condition includes, and not limited to, the following conditions: 1) the vehicle speed is equal to or lower than a predetermined value that approximates to zero; 2) a brake pedal is operated (in ON state); and 3) an accelerator pedal is released (in OFF state). Then a command for re-starting the engine is issued upon establishment of an engine re-start condition that includes, and not limited to, the following conditions 1) the accelerator pedal is operated; and 2) the brake pedal is released.

The aforementioned eco-run control (or a D-range eco-run control) is employed to stop the engine when the vehicle temporarily stops at a stop signal or the like during a travel to a destination. Accordingly it is required that the engine be re-started upon takeoff after the temporary stop of the vehicle without a delay. However, as various controls are performed from the start of the engine stop control until re-start of the engine, a delay in the start of the vehicle may make the driver irritated because of the sense of delay.

If the engine is stopped by merely stopping the fuel supply, the engine undergoes inertial rotation, during which torque is caused by compression pressure, resulting in vibrations. Such an event is likely to occur in diesel engines that involve high-pressure compression. Therefore, in order to smoothly stop the engine operation, the flow rate of intake air is required to be reduced by closing an intake throttle valve or an EGR valve (a valve for re-circulating exhaust gas to an intake side) so that a quantity of air introduced into each cylinder is reduced and the actual compression ratio is reduced, before stopping the supply of fuel.

The engine operation is not stopped immediately after the stop of the fuel supply but continues running by inertia. The engine speed gradually decreases until the engine finally stops. In order to re-start the engine subsequently, it is necessary to crank the engine. If the engine is cranked using a gear-type starter, it is necessary to determine whether the engine has been in a stopped state before engagement between the gear of the starter and a gear of the engine because those gears can be meshed in a state where the engine operation is stopped.

It is determined that the engine has stopped on the basis of an electric signal, for example, a pulse signal obtained by rotation of a rotating shaft such as a crank shaft. Due to the need to discriminate between a signal state caused by a stop of the engine and a signal state caused by a temporary reduction of the engine speed, the determination of the stop is made based on the continuation of the signal state for a predetermined time period. That is, determining whether the engine has stopped requires a certain amount of time in order to prevent a false determination.

After it is determined that the engine has stopped as described above, engine re-start control is executed by, for example, operating the starter, and re-starting fuel injection, etc., is resumed. Thus, after the stop condition is established, a preparatory control for stopping the engine, for example, a control for reducing the intake or the like, is performed. Then, the fuel supply is stopped so as to wait for a decrease in the engine speed. After the elapse of the time for the determination, the engine is restarted.

In the conventional control technology using a gear-type starter, in order to establish smooth gear engagement, the engine is re-started only when it is determined that the engine has stopped as described above. Therefore, even if the engine re-start condition, for example, depression of the accelerator pedal, is established (request for re-starting) immediately after establishment of the engine stop condition, the engine is not re-started. This is because the engine is re-started after an elapse of time taken for executing the engine stop control. As a result, the engine is re-started with excessive delay. When the request for re-starting the engine is issued immediately after establishment of the engine stop condition, the engine is re-started with a certain time lag, which makes the driver experience a sense of delay.

SUMMARY OF THE INVENTION

Accordingly, the invention thus provides a control apparatus of an internal combustion engine, which is capable of improving the response to a re-start of the engine that has been automatically stopped.

In an exemplary embodiment of the invention, when the request for restarting the engine is issued during a predetermined period prior to completing the start of the engine, the engine stop control is discontinued even if the engine stop condition is established. This makes it possible to allow the engine to be continuously operated without being stopped. In a control apparatus for an internal combustion engine, a stop control for stopping the internal combustion engine is executed when a predetermined engine stop condition is established. The stop control includes an operation to stop the supply of fuel to the engine. A re-start control for re-starting the internal combustion engine is executed when a predetermined engine re-start condition is established. The re-start control includes an operation to resume the supply of fuel to the engine. The stop control for stopping the engine is discontinued when the predetermined engine re-start condition is established during a predetermined period between establishment of the predetermined engine stop condition and stop of the internal combustion engine.

According to the aforementioned exemplary embodiment, establishment of the engine stop condition is followed by the engine stop control. In the case where the engine re-start condition is established during a predetermined period prior to the stop of the engine, the engine stop control for stopping the engine is discontinued. This may allow continuous operation of the engine without being stopped. Therefore, the engine is promptly operated in response to the establishment of the engine re-start condition without delay, avoiding the time lag in the response to the engine re-start control.

The predetermined period is a period taken for an engine stop preparatory control executed before the operation to stop the supply of fuel to the internal combustion engine so as to decrease a speed of the internal combustion engine.

In the exemplary embodiment, when the engine re-start condition is established in the state where the engine is operated at the decreasing speed, the engine stop control is discontinued. As a result, the engine is continuously operated without being stopped. The engine, thus, can be driven promptly in response to the establishment of the engine start control with no delay. The time lag in the response to the engine re-start control can be avoided.

The controller discontinues the stop control for stopping the internal combustion engine by controlling the internal combustion engine into a predetermined operating state where the engine starts rotating by itself.

In the aforementioned exemplary embodiment, when the engine stop control is discontinued, the operation state of the engine that has been changed until discontinuation of the engine stop control is recovered to the state prior to the engine stop control. As a result, autonomous operation of the engine can be continued.

The controller initiates re-start of the internal combustion engine when the internal combustion engine is stopped even after initiating the discontinuation of the control for stopping the internal combustion engine.

In the aforementioned exemplary embodiment, when the engine is stopped even if the engine stop control is discontinued during operation of the engine, the engine is immediately re-started. Start of the engine, thus, can be promptly executed upon establishment of the engine re-start condition. As a result, the delay in response to the engine starting control may be avoided or reduced.

The predetermined period is a period taken for decreasing an opening of a flow control valve at an intake side that is decreased before stopping the supply of fuel to a predetermined opening degree.

In the aforementioned exemplary embodiment, when the engine re-start condition is established during a period for which the opening of the flow control valve at the intake side is reduced to a predetermined value while supplying the fuel, the engine stop control is discontinued. As a result, the engine stop control is discontinued while keeping the intake operation. This may allow the operation of the engine continuously, thus improving the response to the control for re-starting the engine upon establishment of the engine re-start condition.

The predetermined period is a period taken for decreasing a speed of the internal combustion engine to a predetermined engine speed after stop of the supply of the fuel.

In the aforementioned exemplary embodiment, even after the fuel supply has been stopped the engine stop control upon establishment of the engine stop condition, the engine stop control may be discontinued so long as the speed of the engine is equal to or greater than a predetermined value. This makes it possible to have an autonomous engine operation by resuming the fuel supply to the engine. As a result, even after the engine stop control has been started upon establishment of the engine stop condition, the opportunity of autonomous engine operation upon establishment of the engine re-start condition may be increased.

The controller re-starts the supply of fuel after increasing the opening of the flow control valve at the intake side that has been decreased before stopping the supply of fuel.

In the aforementioned exemplary embodiment, in the case where the engine stop control is discontinued, the opening of the flow control valve at the intake side is increased before resuming the fuel supply. This makes it possible to have the engine autonomously operated reliably and smoothly.

The controller re-starts the supply of fuel when a speed of the internal combustion engine at a time when the opening of the flow control valve at the intake side is increased to a predetermined opening degree becomes equal to or higher than a predetermined engine speed.

In the exemplary embodiment of the invention, the supply of fuel is resumed upon discontinuation of the engine stop control if the engine speed obtained when the opening of the flow control valve at the intake side is increased to a predetermined value. This makes it possible to have the engine autonomously operated reliably and smoothly.

BRIEF DESCRIPTION OF THE DRAWINGS

The foregoing and further objects, features and advantages of the invention will become apparent from the following description of a preferred exemplary embodiment with reference to the accompanying drawings, wherein like numerals are used to represent like elements and wherein.

DETAILED DESCRIPTION OF PREFERRED EMBODIMENTS

Figure 11:
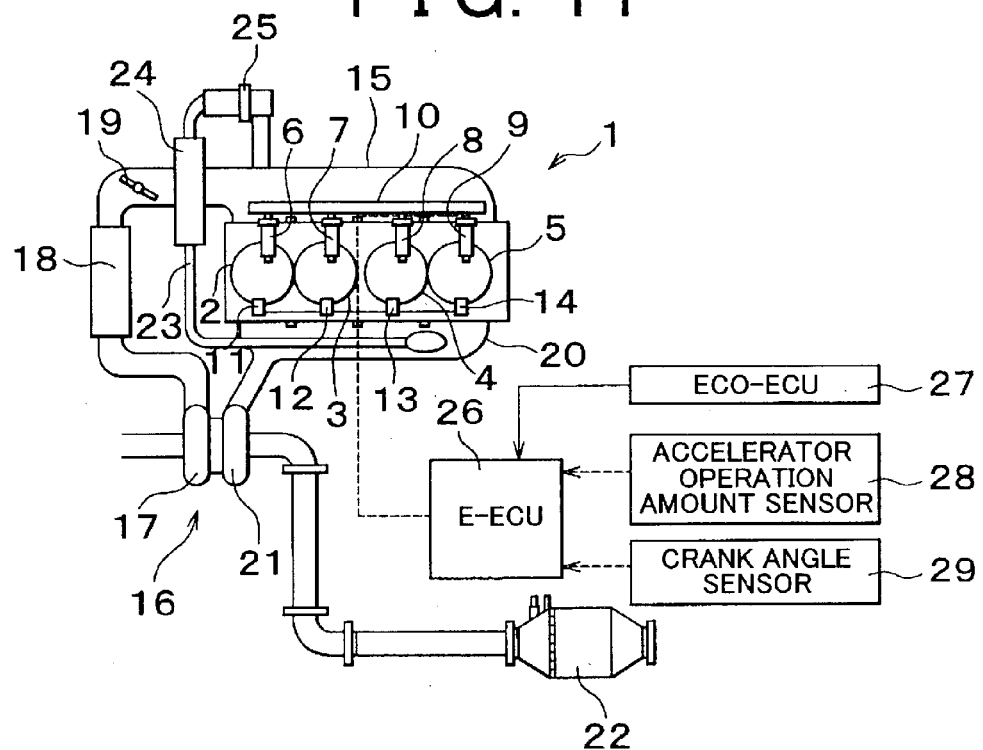
FIG. 11 is a block diagram schematically illustrating a control system of an internal combustion engine to which the invention pertains.

An internal combustion engine of the exemplary embodiment according to the invention can be automatically stopped and automatically re-started by supplying/stopping fuel or air to the engine or by performing/stopping ignition of the fuel. Diesel engines, gasoline engines, and other type of engines using gas as a fuel may be employed as the internal combustion engine of the exemplary embodiment. FIG. 11 shows a diesel engine as an example of the internal combustion engine (engine) 1. The diesel engine shown in FIG. 11 is a so called direct injection-type engine in which fuel is injected directly into cylinders 2, 3, 4, 5, and equipped with an exhaust gas recirculating mechanism for exhaust emission control.

Each of the cylinders 2, 3, 4, 5 is provided with a corresponding injector 6, 7, 8, 9 that injects fuel at a high pressure. These injectors 6, 7, 8, 9 are connected to a common rail 10 that supplies the fuel under high pressure that has been pressurized. Each of the cylinders 2, 3, 4, 5 has a glow plug 11, 12, 13, 14, respectively.

An intake manifold 15 that distributes intake air to the cylinders 2, 3, 4, 5 is connected to a compressor 17 of an exhaust-type supercharger 16. An intake passage extending from the compressor 17 to the intake manifold 15 is provided with an intercooler 18 for cooling the intake air that has been pressurized and heated, and an intake throttle valve 19 for controlling the amount of intake. The intake throttle valve 19 is electrically controlled by an actuator (not shown) such as a motor.

An exhaust manifold 20 connected to exhaust ports of the cylinders 2, 3, 4, 5 is connected to an exhaust turbine 21 of the exhaust-type supercharger 16. The exhaust turbine 21 is communicated with a catalytic converter 22 that has an exhaust emission control catalyst.

An exhaust gas recirculation passage 23 is provided, in which a portion of the exhaust gas produced in the cylinders 2, 3, 4, 5 is guided to the intake manifold 15. The exhaust gas recirculation passage 23 is provided with an EGR cooler 24 for cooling exhaust gas and an EGR valve 25 for controlling the amount of flow of exhaust gas, in that order from the side of the exhaust manifold 20. The EGR valve 25 and the intake throttle valve 19 correspond to an intake-side flow adjusting valve in the invention.

The above-described engine 1 is automatically stopped upon establishment of a predetermined engine stop condition in which the braking is operated in a stopped state of the vehicle. When the engine stop condition fails to be established by release of the brake pedal, the engine is automatically re-started. For this control, an engine electronic control unit (E-ECU) 26 and an eco-run electronic control unit (ECO-ECU) 27 are provided.

Each of the electronic control units 26, 27 is formed mainly by a microcomputer. The E-ECU 26 is designed to control the operating state of the engine 1 by performing a computation based on input data. Specifically, the E-ECU 26 drives a starter (not shown) upon an engine re-start request, and brings the gear of the starter into engagement with a gear on the engine 1 side so as to crank the engine 1. Furthermore, the E-ECU 26 controls the amount of fuel injection in accordance with a request for acceleration/deceleration, and, if necessary, controls the degree of opening of the intake throttle valve 19 and the EGR valve 25 as well. The E-ECU 26 further controls the supercharge pressure produced by the exhaust-type supercharger in accordance with the request for acceleration/deceleration.

The ECO-ECU 27 performs computation based on input data, so as to determine whether an engine stop condition is established, or whether an engine re-start condition is established. On the basis of a result of such determination, the ECO-ECU 27 sends a request for stop or re-start of the engine to the E-ECU 26. The engine stop condition is established if it is determined that the vehicle speed is zero and that a brake pedal is operated. The engine re-start condition is established upon cancellation of the aforementioned engine stop condition when the vehicle speed becomes greater than zero or the brake pedal is released. In response to the engine stop request or the engine re-start request, the E-ECU 26 stops or re-starts the engine 1. In case of no request for stop or re-start of the engine, the E-ECU 26 controls an output of the engine 1 in accordance with the required driving amount, for example, accelerator opening, so as to control the output of the engine 1.

In order to perform the aforementioned controls, an accelerator operation amount sensor 28 and a crank angle sensor 29 are connected to the E-ECU 26. Although not indicated in the drawings, other suitable signals, such as vehicle speed signals and the like, are input into either one of the electronic control units 26, 27.

Figure 12:
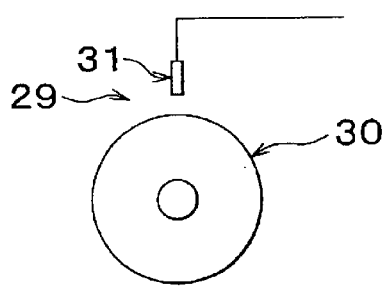
FIG. 12 is a schematic diagram of a crank angle sensor.

The crank angle sensor 29 serves to detect the crank angle in order to determine a cylinder to which the fuel injection is to be performed. As shown in FIG. 12, the crank angle sensor 29 has an angle plate 30 mounted on an output shaft of the engine 1, and a pickup 31 disposed at a predetermined position radially outward of the angle plate 30. The angle plate 30 is a disc-shaped or a gear-shaped member that has, on its outer peripheral edge, protrusions or teeth formed at every predetermined angle (e.g., every 10 degrees). The pickup 31 is a generally termed electromagnetic pickup that is designed to generate a signal every time a protrusion or tooth of the angle plate 30 approaches and moves away from the pickup 31.

A protrusion or a portion with no tooth is formed on the outer periphery of the angle plate 30. The signal produced in the protrusion or the portion with no tooth may be different from those produced in the rest of the portions of the angle plate 30. Although not shown, a disc having only one protrusion or tooth is attached to a rotating shaft, for example, a cam shaft that undergoes one rotation during two rotations of the crankshaft, and a pickup similar to the pickup 31 is disposed radially outward of the disc. In response to the single protrusion or tooth of the disc, a signal is output.

The position of the protrusion or the tooth is related to a predetermined piston position (top dead center or bottom dead center). Each position of the pistons in the cylinders 2, 3, 4, 5 is determined based on the signal obtained through rotation of the angle plate 30 and the disc, or alternatively the pulse signal obtained by waveform shaping of the signal. Then the cylinder into which the fuel is injected can be identified. The technology for identifying the angular position of the crank shaft or the cylinder into which the fuel is injected on the basis of the angular position is disclosed in, for example, JP-A-11-62681.

Figure 1:
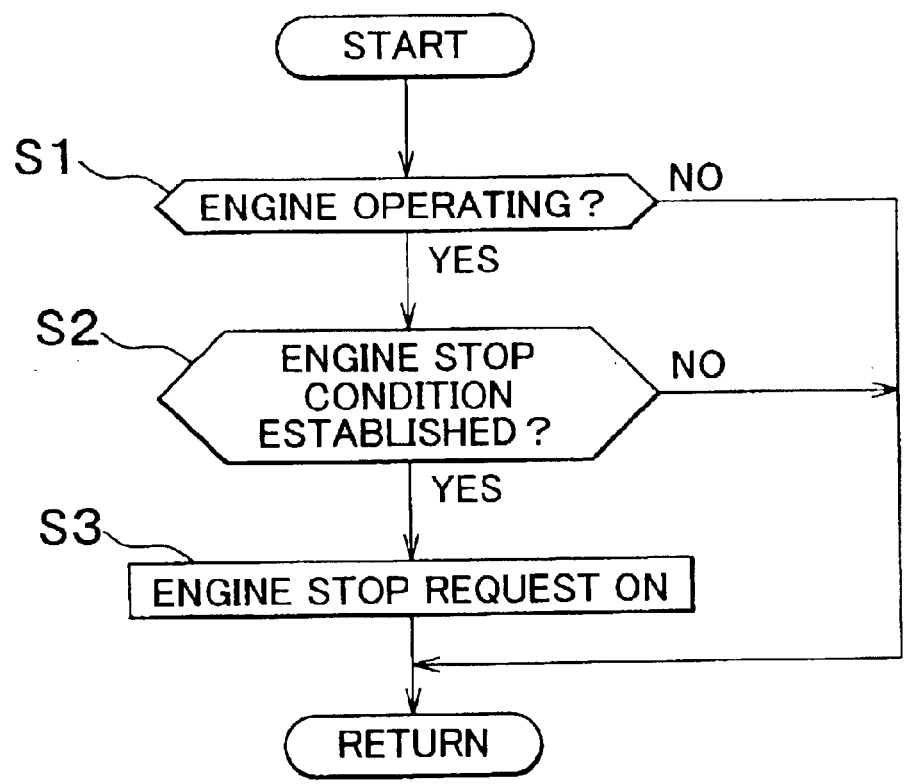
FIG. 1 is a flowchart for illustrating an exemplary embodiment of the invention stop, the flowchart illustrating a routine for outputting a stop request to stop an engine.

A control of stopping and re-starting the engine 1 under eco-run control by the control apparatus including the ECUs 26, 27 will be described. FIG. 1 is a flowchart illustrating a control routine executed by the ECO-ECU 27 for determining the stopped state of the engine 1. This routine is repeatedly executed at a short interval. First in step S1, it is determined whether the engine 1 is operated. When the engine 1 is stopped and accordingly NO is obtained in step S1, the routine returns without executing the control.

Conversely, when the engine 1 is operated and accordingly YES is obtained in step S1, the process proceeds to step S2. While the engine 1 is being operated, it is determined whether an engine stop condition is established in step S2. The engine stop condition is established in accordance with the state of the vehicle in which the engine 1 is installed. For example, if it is determined that the vehicle speed is zero and a braking operation, for example, depression of the brake pedal or the like, is performed, the engine stop condition is established.

If NO is obtained in step S2, the process returns without executing the control routine. Conversely, if YES is obtained in step S2, a request for stopping the engine is turned ON in step S3. That is, a signal indicating the request for automatically stop the engine 1 is sent to the E-ECU 26.

Figure 2:
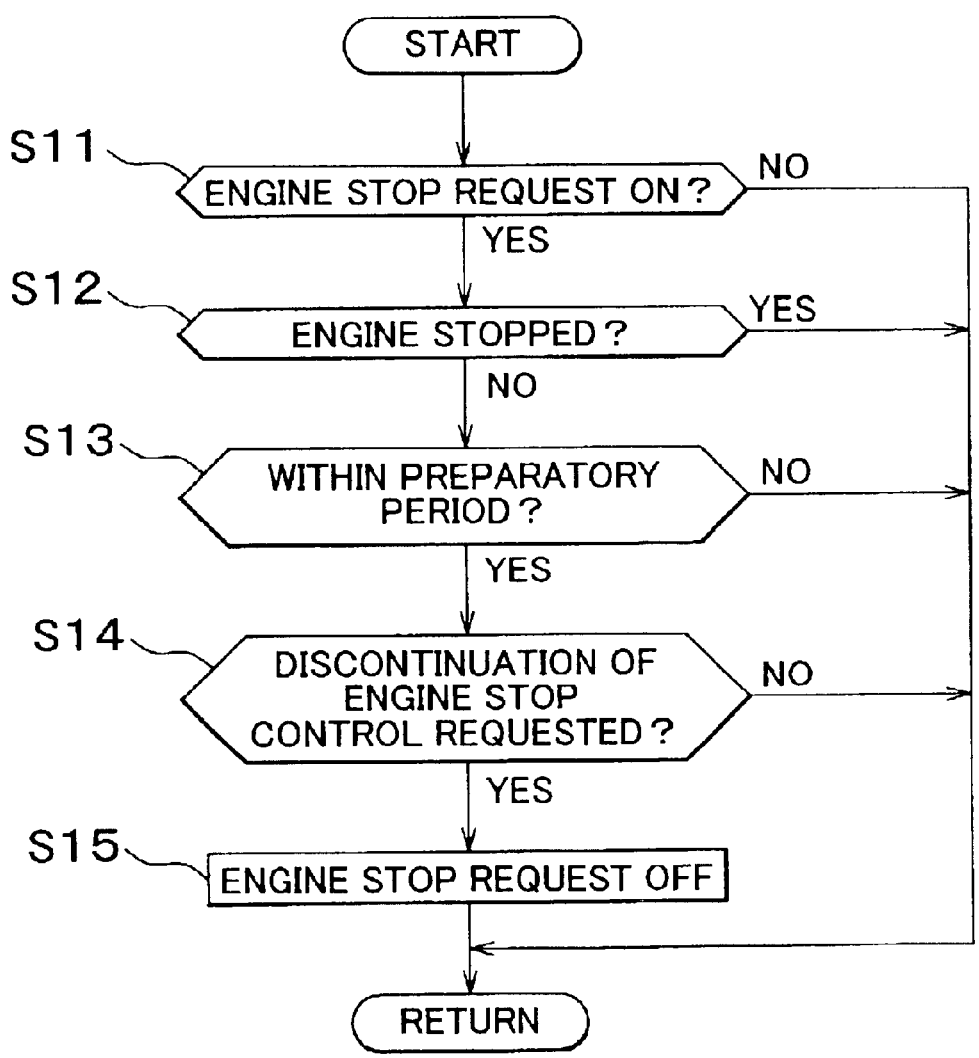
FIG. 2 is a flowchart illustrating a control performed when a re-start request occurs during the stop control based on the stop request.

FIG. 2 is a flowchart illustrating an exemplary engine stop request control routine executed by the E-ECU 26 on the basis of the request for stopping the engine. The control routine is repeatedly executed at every short interval. First in step S11, it is determined whether the ECO-ECU 27 has issued the request for stopping the engine.

If the engine 1 has already stopped, or if the vehicle is running in the state where the accelerator pedal has been depressed to a certain degree, it is determined that the engine stop condition is not established. Therefore NO is obtained in step S11. Then the process returns without executing the control routine. Conversely, if YES is obtained in step S11, the process proceeds to step S12 in which it is determined whether the engine 1 is in a stopped state.

As described above, the output of the engine 1 is controlled in accordance with the required driving amount represented by the depression amount of the accelerator pedal or the like. Therefore, if the aforementioned engine stop condition is established, and accordingly YES is obtained in step S11, the engine 1 is in an idling state because the accelerator pedal has been released. The engine 1, however, may stall from the idling state owing to an error in a clutch operation of a transmission (not shown). In step S12, it is determined whether the engine stall or the like has occurred.

If YES is obtained in step S12, no further control for stopping the engine is required, and the process returns. Meanwhile if NO is obtained in step S12, that is, the engine 1 is in the idling state, the process proceeds to step S13. In step S13, it is determined whether the control is in a preparatory stage for the engine stop control.

If the request for stopping the engine 1 is issued to the E-ECU 26 upon establishment of the engine stop condition, the E-ECU 26 executes the control for stopping the engine 1 under the eco-run control. The aforementioned control discontinues the fuel supply so as to stop the engine 1, and prevents the vehicle from idling, thus improving the fuel efficiency. In this case, when the fuel supply to the engine 1 during its operation abruptly, the intake air or EGR may cause a high compression force, generating a torque or vibration. The aforementioned event is likely to be generated in the diesel engine.

In order to smoothly stop the engine 1, the degrees of opening of the EGR valve 25 and the intake throttle valve 19 are decreased to reduce the amount of air taken into the cylinders 2, 3, 4, 5, respectively. After the degrees of opening of the intake throttle valve 19 and the EGR valve 25 become a predetermined value or less, for example, they are brought into a completely closed state, the fuel supply (injection) to the engine 1 is stopped. Although the engine 1 is continuously operated by an inertial force even after stopping the fuel supply, the engine speed gradually decreases. Even if the engine operation continues after stopping the fuel supply, air is not taken into the cylinders. The speed of the engine 1, thus, can be smoothly decreased.

The speed of the engine 1 decreases after stopping the fuel supply, and reaches zero after an elapse of a predetermined time. The stopped state of the engine is determined on the basis of detection results of the crank angle sensor 29. In the above case, an update state of the pulse signal is monitored for a predetermined time period so as to avoid an error in determination owing to disturbance. When no change is detected in the signal during the predetermined time period, it is determined that the engine 1 has been stopped.

The engine stop control completes through:

1) the period for a preparatory stage for stopping the engine 1 from decrease in the opening degree of the valve on the intake side to stop of the fuel supply, 2) the period taken for the speed of the engine 1 to gradually decrease until the speed becomes zero, 3) the period taken for determining a stop of the engine 1 prior to engagement of the gear of the starter with the gear of the engine 1, and 4) the period taken for the engine 1 to autonomously operate by cranking using the starter.

In step S13, it is determined whether the determination is made at a time point in the middle of the preparatory stage of the engine stop control. When NO is obtained in step S13, the process returns. The NO obtained in step S13 represents that the engine stop control has been already implemented, and the fuel supply is stopped, that is, the engine speed has been already decreasing. In this case, therefore, the process returns with no further execution of the control routine.

Conversely, if YES is obtained in step S13, the process proceeds to step S14 where it is determined whether there is a request for discontinuing the engine stop control. When the aforementioned stop condition is not established, the request for discontinuing the engine stop control is generated by the ECO-ECU 27 before the engine 1 is stopped by the engine stop control. The request for discontinuing the engine stop control intends to bring the engine 1 into the operating state immediately before the engine stop control or the operating state in accordance with the required driving amount.

If NO is obtained in step S14 because of no request for discontinuing the engine stop control, the process returns and the engine stop control is continued. If YES is obtained in step S14 because of the request for discontinuing the engine stop control, the process proceeds to step S115 where the request for stopping the engine is turned OFF. That is, the control for automatically stopping the engine 1 is discontinued.

Specifically, in the aforementioned engine stop preparatory period, the openings of the intake throttle valve 19 and the EGR valve 25 are reduced. However, the reduced opening is increased to its original state in response to the request for discontinuing the engine stop control. In the case where the request for discontinuing the engine stop control is issued on the basis of the release of the brake pedal and the accelerator pedal is released, the engine 1 is brought into the idling state. If the accelerator pedal is depressed, the amount of fuel in accordance with the opening degree of the accelerator is injected.

In the control apparatus, the engine stop control is discontinued and the engine 1 is brought into the autonomous operation even after the start of the engine stop control upon establishment of the engine stop condition under eco-run control only in the period when the engine 1 is in a preparatory stage for stopping, when a certain amount of intake air is provided, or when the engine re-start condition is established during the supply of fuel to the engine. That is, the control apparatus allows the engine 1 to operate autonomously without waiting for an elapse of the preparatory period, or the period taken for stopping the engine 1, or determining the stop of the engine 1. As a result, the time taken from the request for stopping the engine 1 to the actual autonomous operation of the engine 1 is reduced, improving the response to the request for starting the engine 1.

Figure 3:
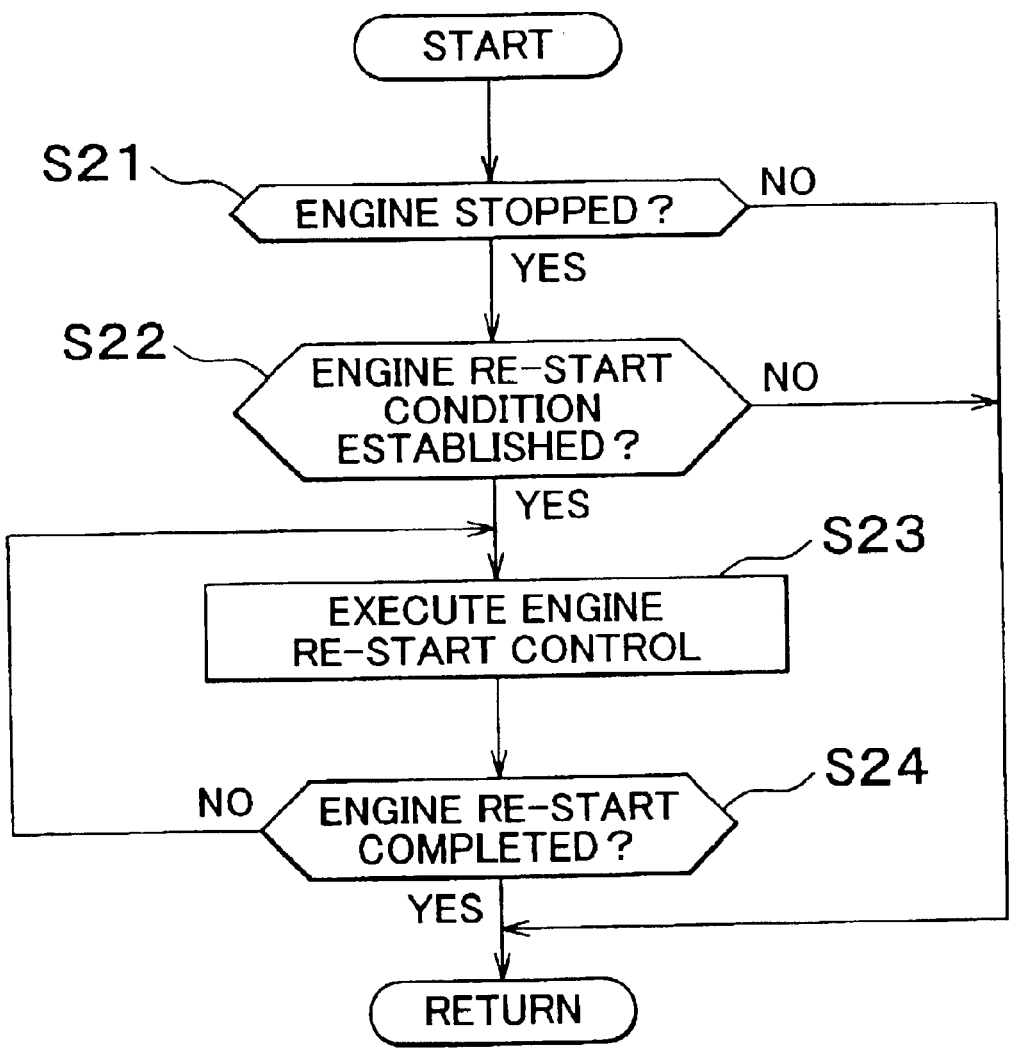
FIG. 3 is a flowchart illustrating an engine re-start control.

In the case where start of the engine is requested upon cancellation of the engine stop condition after an elapse of the preparatory period, the engine stop control is continued, and accordingly the engine 1 is stopped. In the aforementioned state, when the engine start condition is established or the engine start request is issued, the engine 1 is restarted. FIG. 3 illustrates one example of a series of control as aforementioned.

The control routine illustrated in FIG. 3 is repeatedly executed at a predetermined short time interval by the E-ECU 26. First in step S21, it is determined whether the engine 1 is in a stopped state. If the engine 1 is operated, i.e., NO is obtained in step S21, the engine re-start control is not required. The control routine, thus, returns. Meanwhile if the engine 1 is in the stopped state, i.e., YES is obtained in step S21, the process proceeds to step S22 where it is determined whether the engine re-start condition is established. The engine re-start condition is established when at least one requirement of the engine stop condition is cancelled, for example, the brake pedal is released by the vehicle operator. When the engine stop request is cancelled, the engine re-start condition is established. Alternatively, a predetermined signal is sent by the ECO-ECU 27 to establish the engine re-start condition.

If NO is obtained in step S22, start of the engine 1 is not required. The process, thus, returns requiring no further execution of the control. If YES is obtained in step S22, the process proceeds to step S23 where the engine re-start control is performed by cranking of the engine 1 using the starter (not shown). The respective opening degrees of the intake throttle valve 19 and the EGR valve 25 are increased and the fuel injection is resumed so as to bring the engine 1 into an autonomous operation state. The engine re-start control continues until the engine 1 autonomously operates, i.e., YES is obtained in step S24. If the engine operates autonomously, and it is determined that the engine re-start control has been completed, that is, YES is obtained in step S24, the control routine ends.

Figure 4:
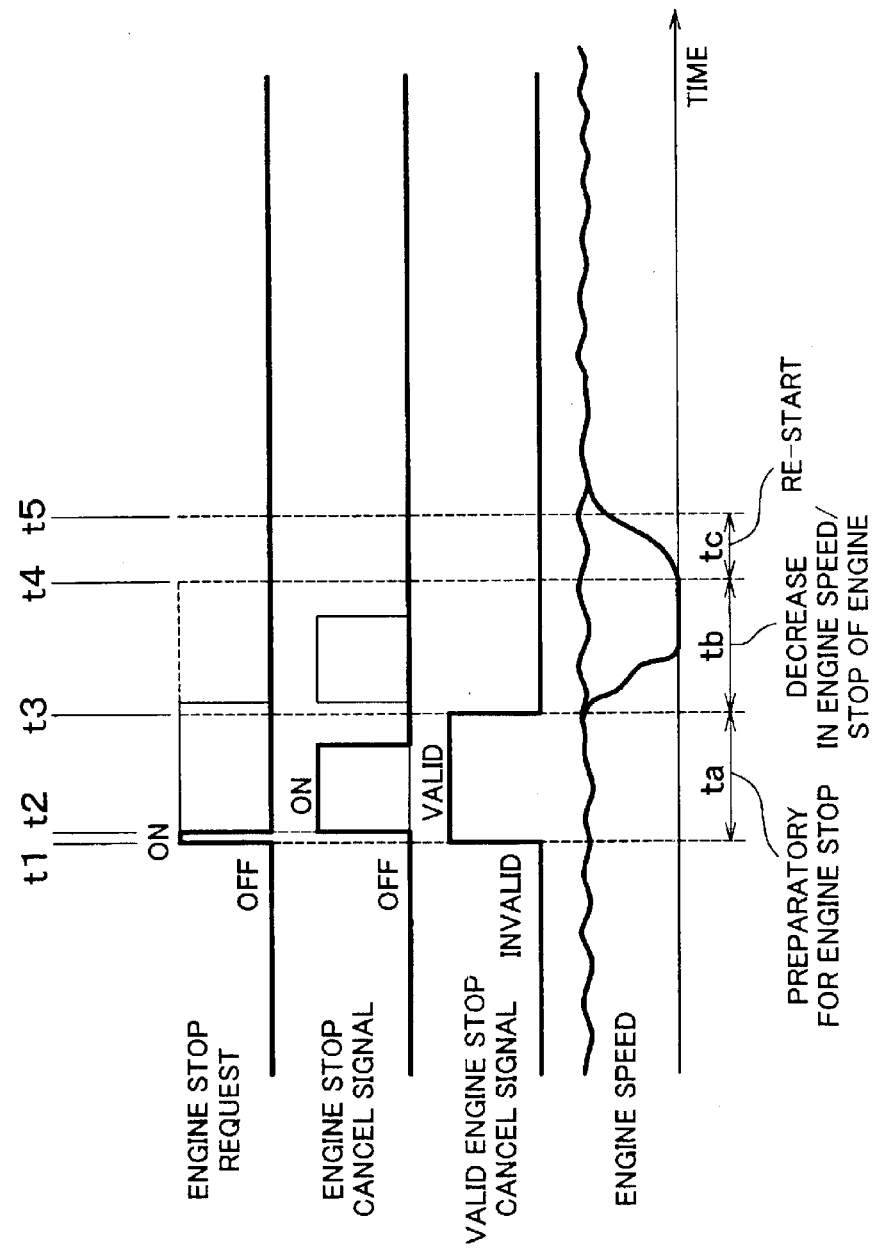
FIG. 4 is a time chart in the case where the control illustrated in FIGS. 1 to 3 is executed.

FIG. 4 shows a time chart obtained from the engine stop control to the engine re-start control. At a time point t1, almost simultaneously with establishment of the engine stop condition after the vehicle stops, the engine stop request is turned ON, and the signal that makes cancellation of the engine stop control effective is brought into an activated state. The activated state continues for an engine stop preparatory period ta taken for decreasing the respective opening degrees of the intake throttle valve 19 and the EGR valve 25 to an almost complete closed state so as to smoothly stop operation of the engine 1.

If the engine stop condition is cancelled and the engine stop request is turned OFF at a time point t2 during the engine stop preparatory period ta, a cancellation signal becomes simultaneously ON. As a result, opening degrees of the intake throttle valve 19 and the EGR valve 25 that have been brought into almost full closed state are increased to the original opening degrees so as to be brought into full open state while the fuel supply being continued. At a time point t3 after an elapse of the engine stop control preparatory period ta, the signal that makes discontinuation of the engine stop control effective is returned to an ineffective state.

When the engine stop condition is not established and the desired driving amount (depression amount of the accelerator pedal) is not increased, the speed of the engine 1 is kept at a speed in an idling state as shown by a bold line of FIG. 4. The output of the engine 1 is increased from the idling state in response to the request for take-off. This makes it possible to prevent the delay to the engine start request, thus improving the control response.

Once the engine stop control is started upon establishment of the engine stop condition, a generally employed control apparatus has to wait until the engine stop control is completed and then re-starts the engine 1. Therefore the engine stop request is held until a time point t4 after elapse of the preparatory period ta and a period tb taken for decrease in the engine speed accompanied by stop of the fuel supply and for determination of stop of the engine 1. During a time period tc from the time point t4, the engine re-start control is executed so as to re-start the engine 1 using the starter, increase the intake air amount, and inject the fuel.

The engine speed becomes zero as shown by the thin solid line, and then the engine 1 is operated at a low speed until the time point t5 when the engine re-start control is completed. That is, even when the engine re-start request is issued at the time point t2, completion of the engine re-start will be delayed to the time point t5. Such delay may cause the vehicle operator to experience a sense of delay, thus deteriorating drivability and riding comfort.

When the engine stop request is turned OFF after the elapse of the time period ta (shown by a thin solid line of FIG. 4), the engine stop control is continued until the engine 1 is stopped. As shown by the thin solid line, the engine speed becomes zero, and then it is increased to the original speed by the engine re-start control.

In the control illustrated by the flowcharts in FIGS. 1 to 3, it is assumed that the engine 1 is brought into the autonomous operation state by discontinuation of the engine stop control. However, there may be a possibility that the engine speed cannot be recovered, leading to the engine stall depending on the timing at which the engine stop control is discontinued, for example, at the timing when the respective opening degrees of the intake throttle valve 19 and the EGR valve 25 correspond to almost full closed state. The following example of the control includes a control scheme to cope with the engine stall.

Figure 5:
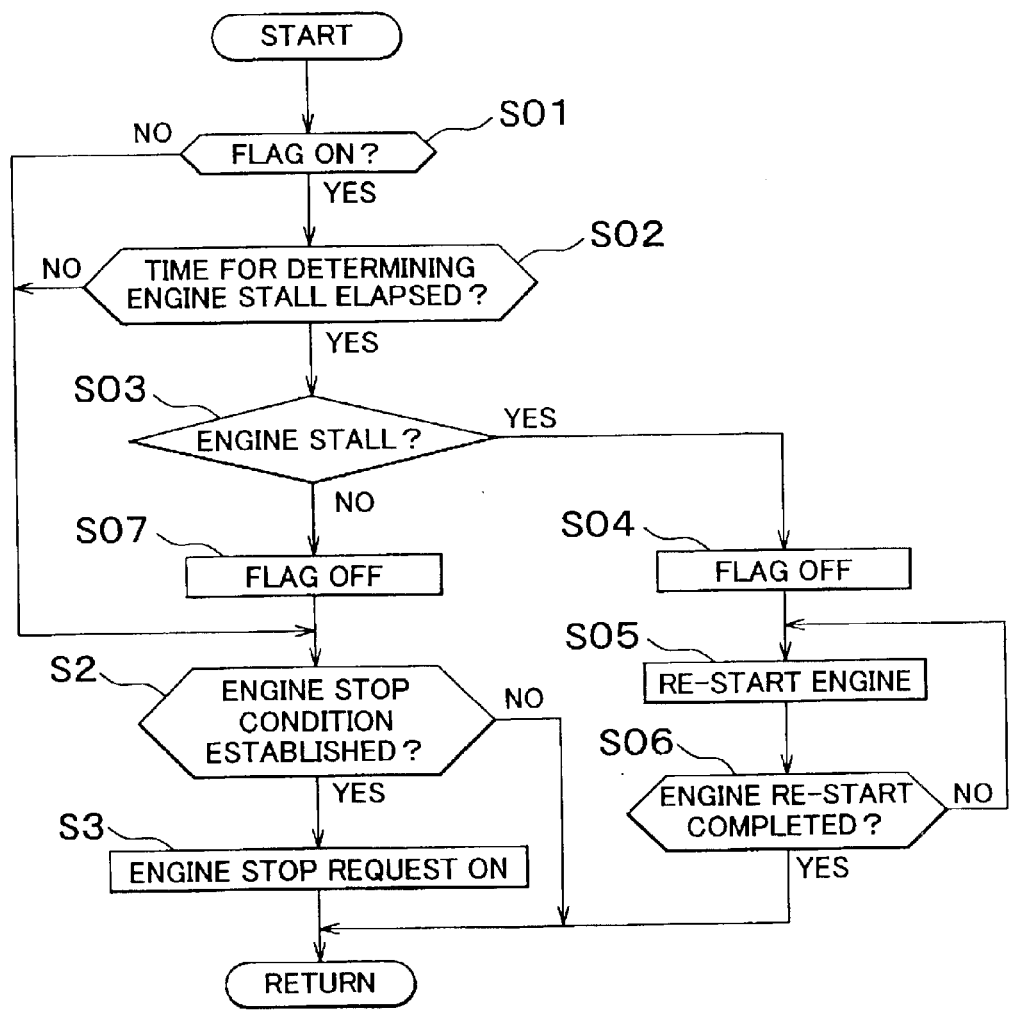
FIG. 5 is a flowchart illustrating a routine for outputting a stop request, which additionally includes a process of checking for an engine stall associated with discontinuation of the stop control.
Figure 6:
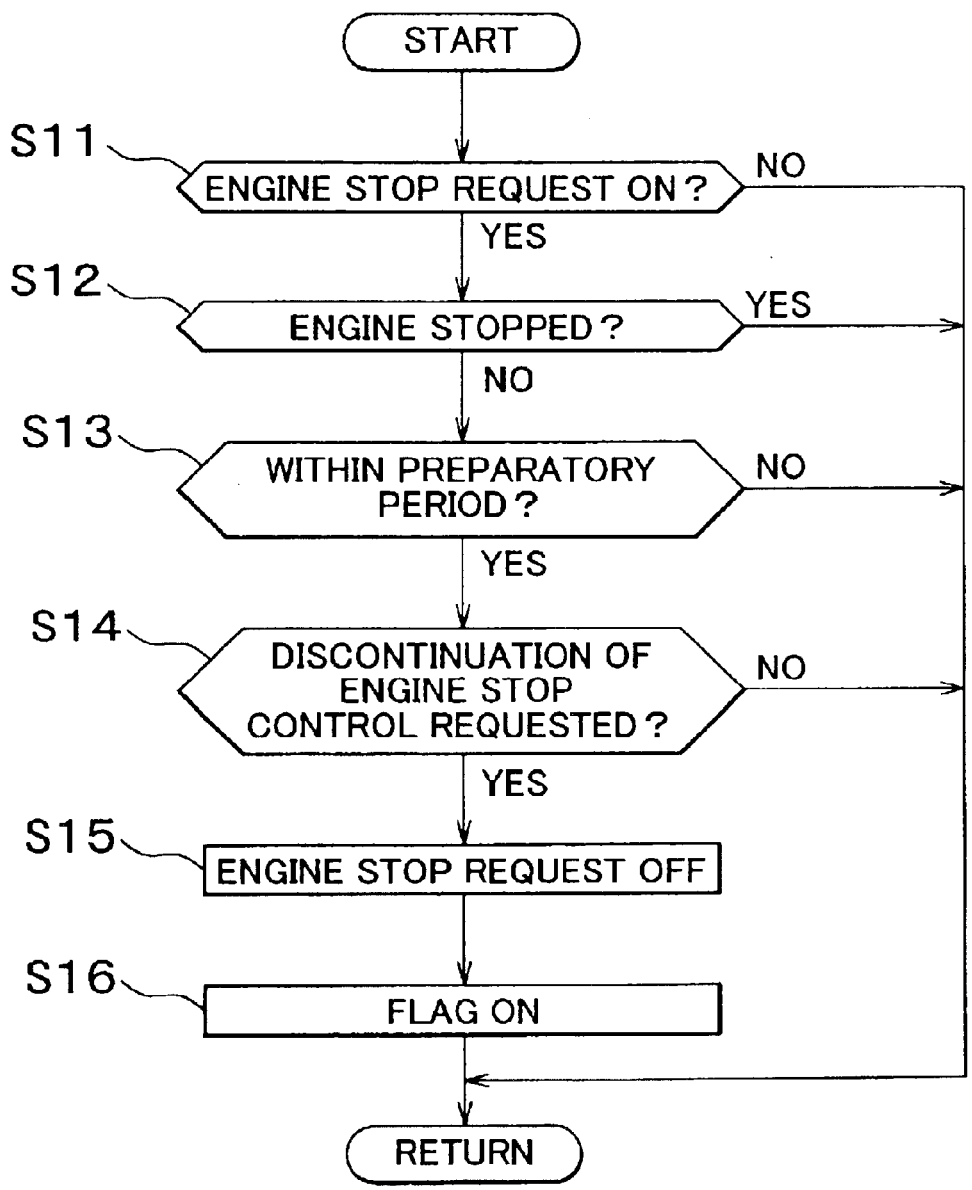
FIG. 6 is a flowchart similar to that of FIG. 2, which further includes a control process regarding a flag that indicates that discontinuation of the stop control has been performed.

In FIG. 5, the flowchart shown in FIG. 1 is combined to the control routine to determine the engine stall. In FIG. 6, the process indicating that discontinuation of the engine stop control has been executed in addition to the flowchart shown in FIG. 2. Referring to FIG. 6, when the engine stop request is turned OFF in step S15, the process proceeds to step S16 where the flag indicating that the discontinuation of the engine stop control is turned ON.

Referring to the flowchart of FIG. 5, it is determined whether the engine 1 has stalled before determination of the establishment of the engine stop condition. That is, in step S01, it is determined whether the flag indicating that discontinuation of the engine stop control is turned ON. When NO is obtained in step S01, that is, discontinuation of the engine stop control has not been executed, and the engine 1 is normally in the operating state. The process, then, proceeds to step S2 where it is determined whether the engine stop condition has been established.

When YES is obtained in step S01, that is, discontinuation of the engine stop control has been executed, the process proceeds to step S02. In step S202, it is determined whether a predetermined time for determining the engine stall is elapsed. The engine stall is determined on the basis of the engine speed after discontinuation of the engine stop control. A predetermined time period is required for determining whether the engine stall occurs, and in step S02, the process waits until the predetermined time period elapses. If NO is obtained in step S02, the process proceeds to step S2.

Conversely, if YES is obtained in step S02 upon the elapse of the predetermined time period for determining the engine stall, the process proceeds to step S03 where it is determined whether the engine stall has occurred. If the engine 1 cannot operate autonomously even if the engine stop control is discontinued, YES is obtained in step S03 because the engine is stopped. The process then proceeds to step S04 where the flag that indicates execution of discontinuation of the engine stop control is turned OFF.

In the aforementioned case, the engine 1 is controlled to be operated in accordance with the required driving amount at a time when the engine stop request is turned OFF. However, as the engine 1 actually stalls, the process proceeds to step S05 where the engine start control is executed. The engine 1 is started by the starter so as to be brought into the operating state in accordance with the required driving amount. The engine start control is continuously executed until the engine 1 autonomously operates and, thus, it is determined that the engine start is completed, that is, YES is obtained in step S06. If YES is obtained in step S06, the process returns. As the usual engine re-start control is executed, the engine 1 can autonomously operate even if discontinuation of the engine stop control has failed to autonomously operate the engine 1.

If NO is obtained in step S03, that is, the engine 1 has not stalled, the process has been executed for discontinuing the engine stop control. Accordingly the process proceeds to step S07 where the flag indicating discontinuation of the engine stop control, and the process proceeds to step S2.

In the above-described example, if the request for discontinuing the engine stop control is issued within the preparatory period ta, the engine stop control is immediately discontinued, and the engine 1 is continuously operated so as to be recovered to the previous operation state. The preparatory period ta continues from a time point when the engine stop condition is established or when the engine stop control is started to a time point when the fuel supply to the engine 1 is discontinued. The time point when the preparatory period ta ends can be determined by stopping the fuel injection. However, the end of the time when the engine re-start request (request for discontinuing the engine stop control) is issued to discontinue the engine stop control does not have to accurately correspond to the timing at which the control for stopping the fuel injection is initiated. A certain degree of delay or advance with respect to the timing may be allowed. As a result, the control executed in response to the engine re-start request issued after initiation of the engine stop control as shown in FIGS. 1 to 3 may be replaced by the control as described below.

Figure 7:
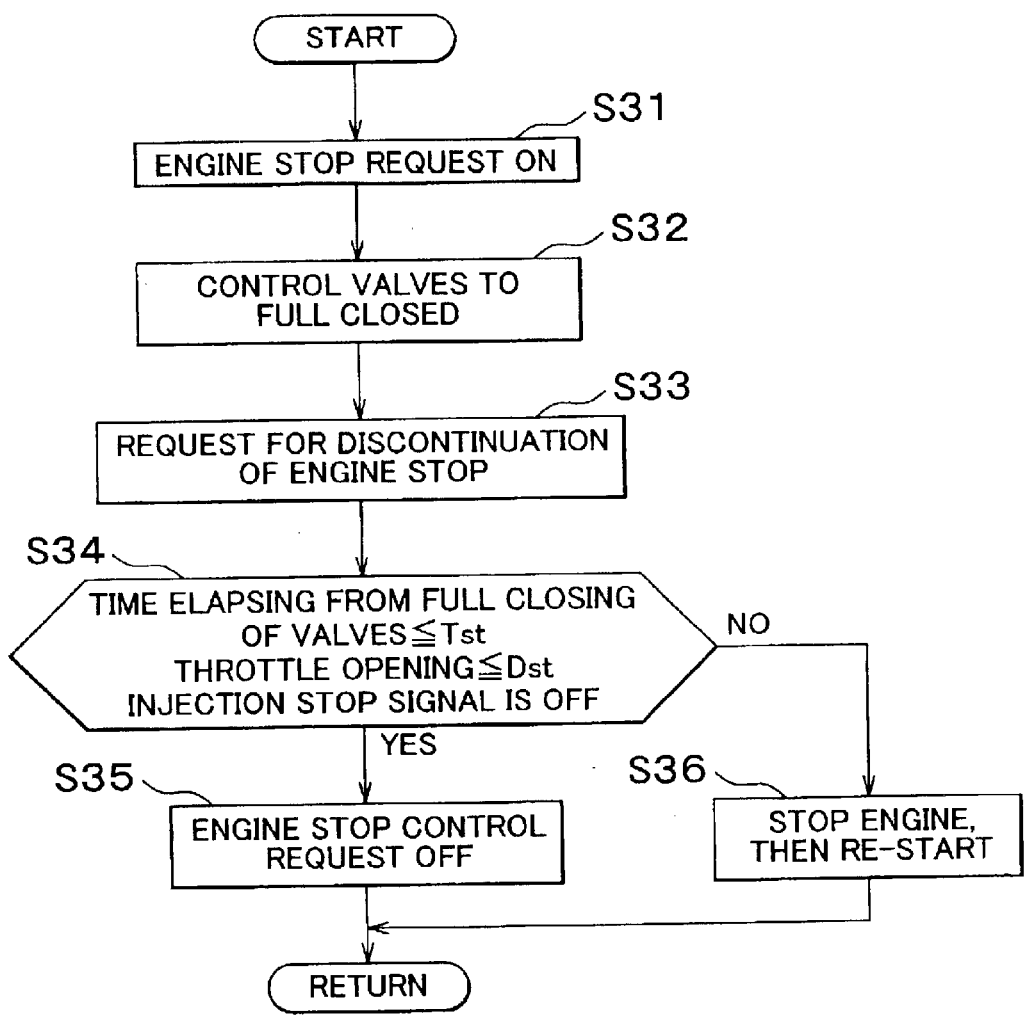
FIG. 7 is a flowchart illustrating a stop control discontinuation determining routine that includes a process of determining a period of change to a stop preparatory period.

FIG. 7 is a flowchart illustrating an example of the control for determining discontinuation of the engine stop control. First in step S31, there is an engine stop request issued. Then in step S32, control for bringing the intake throttle valve 19 and the EGR valve 25 into a full closed state is started, that is, the preparatory control is started.

In step S33, the request for discontinuing the engine stop control is issued. The process proceeds to step S34 where it is determined whether the time elapsing from the start of the closing operation of the intake throttle valve 19 and the EGR valve 25 (start of the control in step S33) is equal to or shorter than a predetermined basic time period Tst, whether the intake throttle opening degree is equal to or smaller than a predetermined basic opening degree Dst, that is, whether the throttle amount of the intake throttle valve 19 is smaller than the DST, or whether the signal indicating stop of the fuel injection is turned OFF (the signal indicating fuel injection is turned ON).

In the control routine, the time elapsing until the intake throttle valve 19 and the EGR valve 25 are brought into full closed states is measured. The reference time Tst is determined as a value that is not considerably shorter or longer than the measured time. That is, the reference time Tst substantially corresponds to the measured time. The reference opening Dst is the throttle amount that substantially corresponds to the full closed state.

If YES is obtained in step S34, the process proceeds to step S35 where the engine stop request is turned OFF, which corresponds to the control executed in step S15 as shown in FIG. 2. Therefore, the engine 1 under the engine stop control is not stopped, and returned to the original operating state. The engine 1, thus, is continuously operated.

If NO is obtained in step S34, the engine stop control is continued. Then in step S36, engine re-start control is executed after stop of the engine 1. More specifically, after it is determined that the engine 1 has been stopped, the starter is driven to bring its gear into an engagement with the gear of the engine 1. In this state, the engine 1 is operated by the starter and the intake throttle valve 19 and the EGR valve 25 are opened so as to start the fuel injection.

The timing at which the request for re-starting the engine during the engine stop control is detected. If the engine re-start request is issued immediately after establishment of the engine stop condition, the output of the engine 1 can be generated without causing the delay in the same way as the control shown in FIGS. 1 to 3. As a result, the sense of delay experienced by the vehicle operator may be avoided because of the output of the engine.

Figure 8:
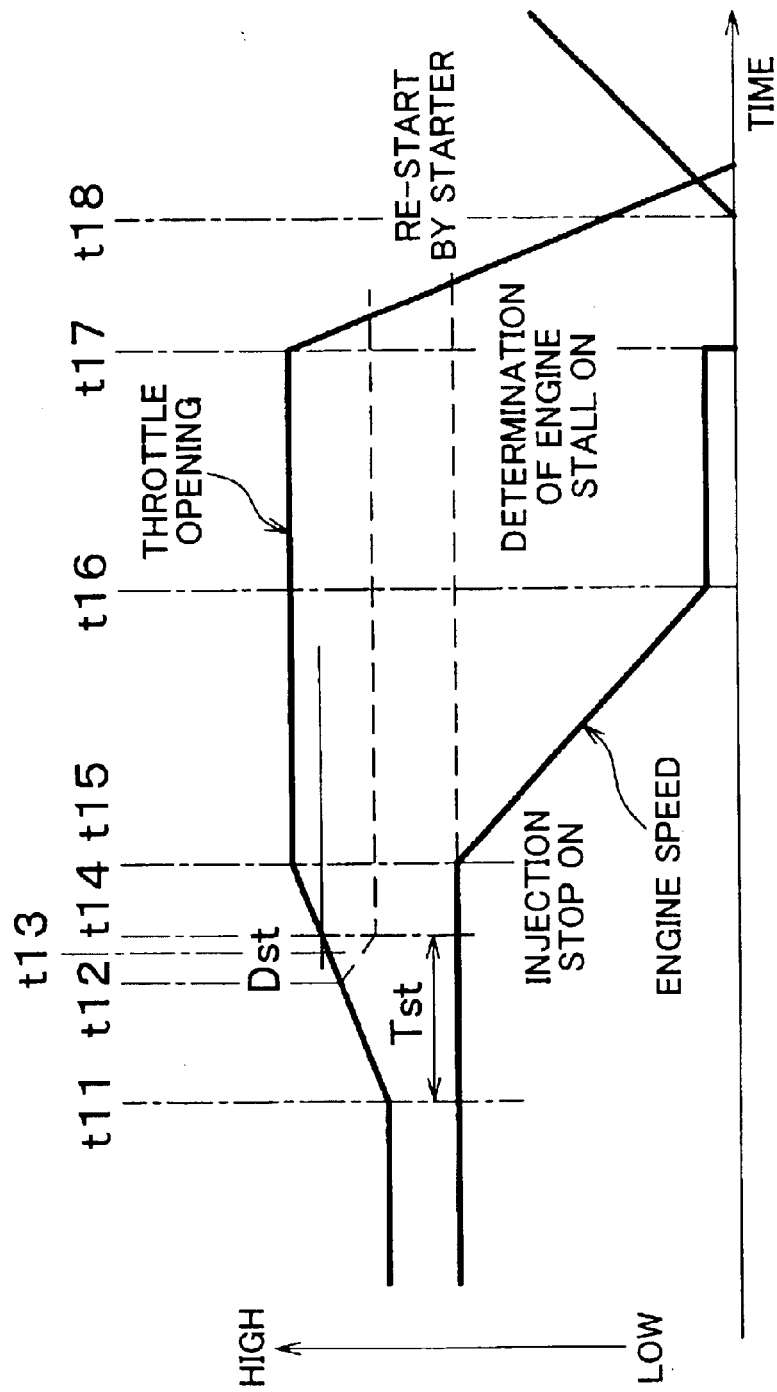
FIG. 8 is a time chart in the case where the control illustrated in FIG. 7 is executed.

FIG. 8 shows a time chart illustrating an example for determining discontinuation of the engine stop control in comparison with an example of a related art. Referring to FIG. 8, upon establishment of the engine stop condition (engine stop request) at a time point t11, the intake throttle valve 19 and the EGR valve 25 are controlled to full close states. When the engine re-start condition (engine re-start request) is established at a time point t12, the engine start control is immediately discontinued. This is because the time point t12 is precedent of a time point t13 at which the reference time Tst passes, a time point t14 at which the intake throttle opening reaches the reference opening Dst, or a time point t15 at which the fuel injection signal is turned ON. That is, the opening degree of the intake throttle valve is returned to the original position, or each of the intake throttle valve 19 and the EGR valve 25 is increased as shown by the dotted line in FIG. 8 in accordance with the required driving amount. As a result, the speed of the engine 1 is held as shown by the dotted line of FIG. 8, or increased in accordance with the required driving amount.

In the related art, once the engine stop control is started, the control is held until the engine 1 is stopped. Therefore, as indicated by a solid line in FIG. 8, the starter is driven to operate the engine at an elapse of a time point t16 when the engine speed becomes zero through stop of the fuel supply, a time point t17 when it is determined that the engine 1 has been stopped, or a time point t18 when the intake throttle opening is reduced such that the opening of degrees of the intake throttle valve 19 and the EGR valve 25 are increased to predetermined values. Therefore, even when the engine re-start request is issued immediately after the establishment of the engine stop condition, the engine 1 is started at a timing behind the time point t18. Therefore, the vehicle operator may experience the delay in response to the engine re-start control.

Another exemplary embodiment of the invention will be described. As stated above, the internal combustion engine to which the invention is applied needs to be cranked for re-starting. The engine is operated by the cranking operation, not by combustion of the fuel. Accordingly, the engine may be cranked not only by the starter serving as a motor but also by the inertial force. The control apparatus according to the invention is designed to discontinue the engine stop control so as to make the engine 1 autonomously operated in response to the engine re-start request under the state where the engine 1 is operated by the inertial force even after stop of the fuel supply by the engine stop control.

Figure 9:
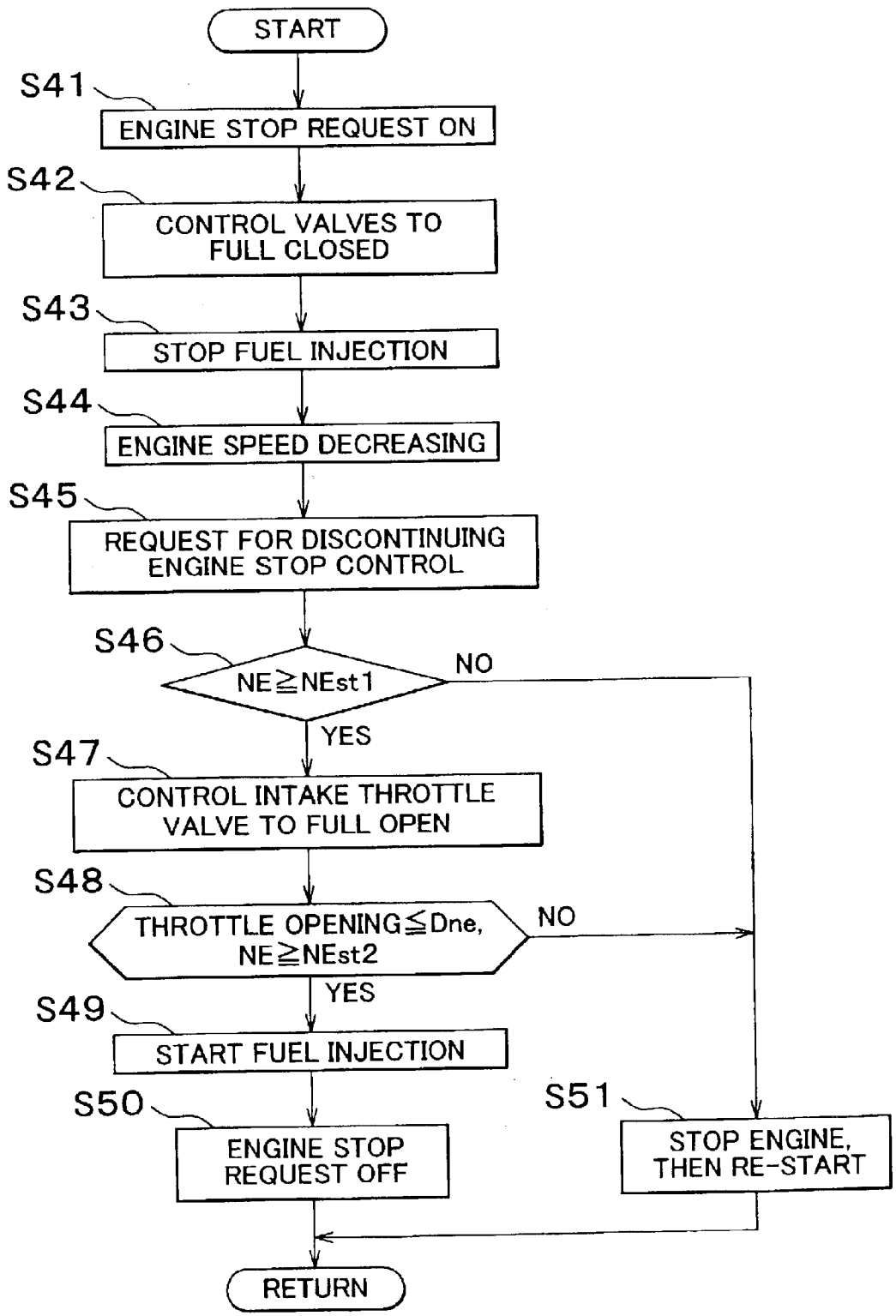
FIG. 9 is a flowchart illustrating a control of discontinuing the stop control after stopping the supply of fuel.

FIG. 9 is a flowchart illustrating the control routine of another exemplary embodiment of the invention. First in step S41, a request for stopping the engine 1 is issued (ON), and the process proceeds to step S42. In response to the engine stop request issued in step S41, in step S42, the intake throttle valve 19 and the EGR valve 25 are controlled to full closed states such that a preparatory control is started. Then in step S43, the fuel injection is stopped owing to the control to fully close the intake throttle valve 19 and the EGR valve 25.

The process proceeds to step S44, where the state of the engine having its speed gradually decreasing owing to a stop of the fuel injection is input. If the request for discontinuing the engine stop control is issued in step S45, the process proceeds to step S46. In step S46, it is determined whether the engine speed NE is equal to or greater than a first reference engine speed Nest1, based on which it is determined whether the engine can be autonomously operated by introducing air and injecting the fuel.

If YES is obtained in step S46, the process proceeds to step S47 where the intake throttle valve 19 is controlled to a full open state. During the control for making the intake throttle valve 19 to the full open state, the engine speed NE is further decreased, and the process proceeds to step S48. In step S48, it is determined whether the throttle amount of the intake throttle valve that allows autonomous operation of the engine 1 is equal to or less than a predetermined value Dne so as not to generate smoke. In step S48, it is further determined whether the engine speed NE is equal to or greater than a second reference engine speed Nest2 (<Nest1) that allows the autonomous engine operation by injection of the fuel.

If YES is obtained in step S48, the process proceeds to step S49 where fuel injection is started. As a result, the engine 1 operated by the inertial force is supplied with air and fuel at a speed sufficient for autonomous operation through combustion of the engine. Therefore, the engine 1 is recovered to the state of autonomous operation.

Subsequently in step S50, the request for stopping the engine 1 is turned OFF, and the engine stop control is discontinued. This step S50 corresponds to the aforementioned steps S15 and S35.

If the engine speed NE at a time when the engine re-start request is issued is lower than the first reference engine speed Nest1, that is, NO is obtained in step 46, the process proceeds to step S51. If the engine speed NE at a time when the intake throttle valve 19 is controlled to a full open state is lower than the second reference engine speed Nest2, that is, NO is obtained in step S48, the process also proceeds to step S51. In step S51, the engine stop control is continued such that the engine 1 is stopped. Then the starter is activated to re-start the engine 1 in the same way as the conventional engine re-start control.

Figure 10:
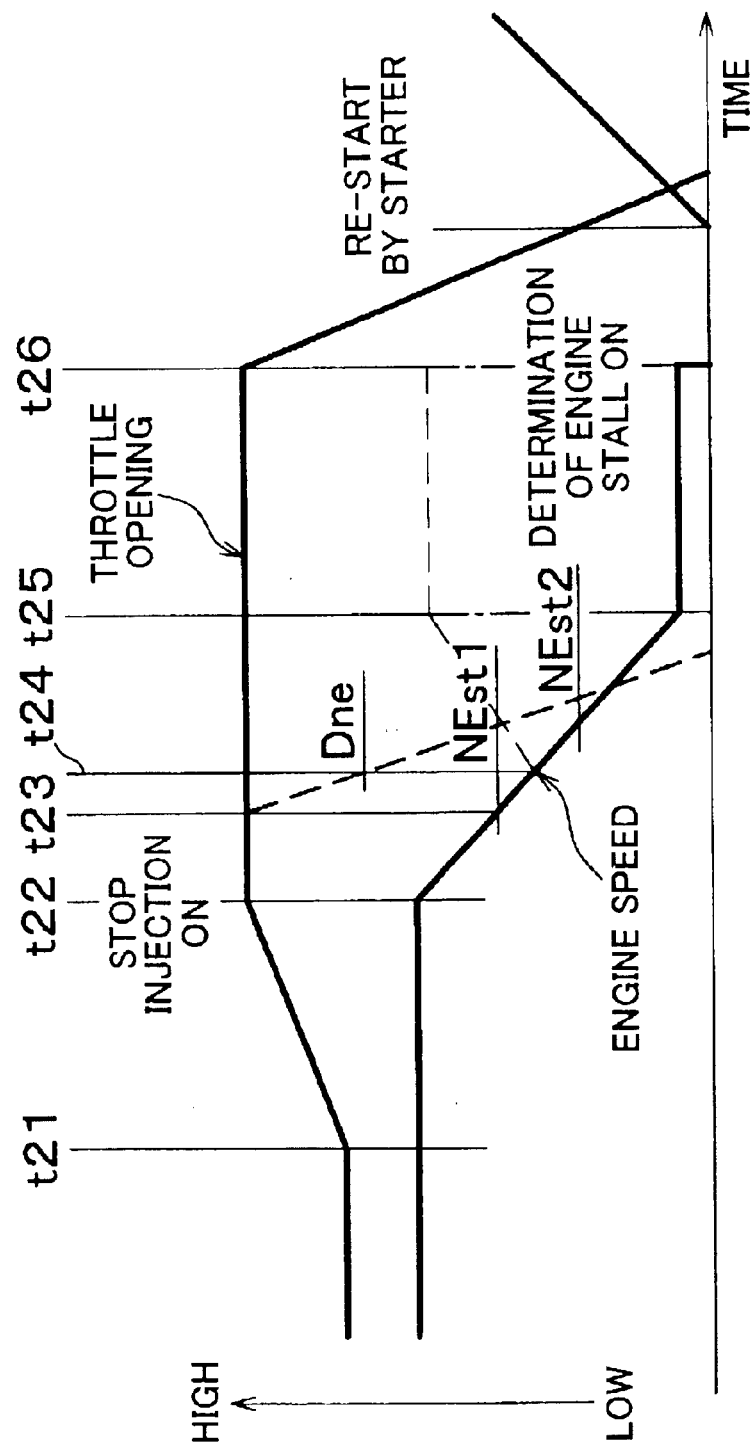
FIG. 10 is a time chart in the case where the control illustrated in FIG. 9 is executed.

FIG. 10 shows a time chart representing the change in the engine speed as the control shown in FIG. 9 is executed. At a time point t21 when the vehicle is in a stopped state, the engine stop condition is established and accordingly the engine stop request is issued. Then the intake throttle opening (throttle amount of the flow control valve at the intake side) is increased. At a subsequent time point t22, the intake throttle is controlled to a full closed state, and the engine speed decreases.

If the engine re-start condition is established and the engine re-start request is issued at a time point t23 when the engine speed becomes equal to or higher than the first reference rotation speed NEst1, the intake throttle valve 19 and the EGR valve 25 are controlled to full open states such that the intake throttle opening is decreased. The opening degrees of the intake throttle valve 19 and the EGR valve are increased until the intake throttle opening is reduced to the aforementioned throttle amount Dne or lower. If the engine speed at a time point t24 is equal to or higher than the second reference engine speed Nest2, the fuel injection is resumed. As a result, the engine 1 is brought into the autonomous operation state.

The engine 1 is controlled to be in an autonomous operation state at the time point t24 immediately after the time point t23 when the engine re-start request has been issued, or at a time point t25 after elapse of a certain length of time from the time point t23. This makes it possible to prevent response delay to the engine re-start request. Even if the engine stop condition is established under the eco-run control, and the engine re-start request is issued immediately, no sense of delay is experienced by the vehicle operator.

Meanwhile in the general control, when the engine re-start request is issued at the time point t23, the engine 1 is re-started by the starter after passage of a time point t26 when the engine 1 is stopped and such state is determined. The re-start of the engine 1, thus, is considerably delayed to the engine re-start request, resulting in the sense of delay.

The engine stop control is discontinued by executing step S15 shown in FIG. 2 and FIG. 6, step S35 of FIG. 7, and steps S47, S49 of FIG. 9. The engine re-start control is implemented by executing step S04 shown in FIG. 4.

The invention is not limited to the foregoing exemplary embodiments. The internal combustion engine to which the invention is applied may be diesel engines other than so called direct injection-type diesel engines, as well as gasoline engines, or internal combustion engines using gas as a fuel. The fuel may be supplied not only by the injector but also a carbureter as a suction type. The internal combustion engine having no exhaust gas recirculating apparatus may also be employed. In this case, the intake throttle valve or the throttle valve serves as the flow control valve at the intake side.

As is apparent from the foregoing description according to the exemplary embodiment of the invention, the engine stop control is started upon establishment of the condition for stopping the engine. When an engine re-start condition is established within a predetermined period prior to stop of the engine, the engine stop control is discontinued. Therefore, the operation of the engine is held without being stopped. The engine, thus, can be driven upon establishment of the engine re-start condition without causing a response delay. This makes it possible to avoid the delay in response to the engine re-start control or the resultant sense of delay experienced by the vehicle operator.

In the exemplary embodiment of the invention, upon establishment of the engine re-start condition in the state where the engine is operated at a reducing speed, the engine stop control is discontinued. Therefore, the engine can be continuously operated without being interrupted. As a result, the engine can be driven without causing the response delay with respect to the estasblishment of the engine re-start condition. As a result, this makes it possible to avoid the response delay to the engine re-start control or the sense of delay experienced by the vehicle operator.

In the exemplary embodiment of the invention, when the engine stop control is discontinued, the operating state of the engine that has been changed by the engine stop control may be returned to the operating state of the engine at a time of starting the engine stop control. This makes it possible to allow continuous operation of the engine.

In the exemplary embodiment of the invention, in the case where the engine stops even if the engine stop control is discontinued while the engine is being operated, the engine is immediately re-started. Therefore, the engine can be re-started promptly in response to the establishment of the engine re-start condition. As a result, the response delay to the engine re-start control may be avoided or reduced.

In the exemplary embodiment of the invention, the engine stop control is discontinued upon establishment of the engine re-start condition during a period taken for decreasing the opening of the flow control valve at the intake side to a predetermined opening degree while supply of fuel. The engine stop control is discontinued while admitting air to the engine. This makes it possible to keep the engine running, thus improving the response to the engine re-start control upon establishment of the engine re-start condition.

In the exemplary embodiment of the invention, even if the engine stop control is executed upon establishment of the engine stop condition so as to stop supply of fuel to the engine, the engine stop control may be discontinued so long as a speed of the engine is equal to or higher than a predetermined value. When supply of fuel to the engine is resumed, the engine is brought into an autonomous operation. Accordingly this makes it possible to allow the engine to be operated immediately after establishment of the engine restart condition.

In the exemplary embodiment of the invention, in the case where the engine stop control is discontinued, the opening of the flow control valve at the intake side is increased prior to resumption of supply of fuel that has been stopped. This makes is possible to bring the engine into an autonomous operation smoothly.

In the exemplary embodiment of the invention, supply of fuel is resumed upon discontinuation of the engine stop control if the engine speed obtained when the opening of the flow control valve at the intake side is increased to a predetermined value. This makes it possible to have the engine autonomously operated reliably and smoothly.

The controllers (e.g., the E-ECU 26 and the ECO-ECU 27) of the illustrated exemplary embodiment are implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. A control apparatus for an internal combustion engine comprising:
   a controller that:
   executes a stop control for stopping the internal combustion engine when a predetermined engine stop condition is established, the stop control comprising an operation to stop a supply of fuel to the engine; and
   executes a re-start control for re-staffing the internal combustion engine when a predetermined engine re-start condition is established, the re-start control comprising an operation to resume the supply of fuel to the engine, wherein the controller discontinues the stop control for stopping the engine when the predetermined engine re-start condition is established during a predetermined period between establishment of the predetermined engine stop condition and stoppage of the internal combustion engine and the predetermined period is a period taken for an engine stop preparatory control that adjusts an engine operation and that is executed before the operation to stop the supply of fuel to the internal combustion engine as to decrease a speed of the internal combustion engine.

2. The control apparatus according to claim 1, wherein the controller discontinues the stop control for stopping the internal combustion engine by controlling a predetermined operating state of the internal combustion engine where the engine starts rotating by itself.

3. The control apparatus according to claim 1, wherein the controller initiates re-start of the internal combustion engine when the internal combustion engine is stopped even after initiating the discontinuation of the control for stopping the internal combustion engine.

4. A method for controlling the stop and restart of an internal combustion engine comprising:
- stopping the internal combustion engine when a predetermined engine stop condition is established, the stopping of the engine including an operation to stop a supply of fuel to the engine;
- re-starting the internal combustion engine when a predetermined engine re-start condition is established, the re-starting of the engine including an operation to resume the supply of fuel to the engine; and
- discontinuing the stopping of the engine when the predetermined engine re-start condition is established during a predetermined period between establishment of the predetermined engine stop condition and stoppage of the internal combust engine, wherein the predetermined period is a period taken for an engine stop preparatory control that adjusts an engine operation and that is executed before the operation to stop the supply of fuel to the internal combustion engine so as to decrease a speed of the internal combustion engine.

5. The method according to claim 4, wherein the stopping of the internal combustion engine is discontinued by controlling a predetermined operating state of the internal combustion engine where the engine starts rotating by itself.

6. The method according to claim 4, wherein the re-starting of the internal combustion engine is initiated when the internal combustion engine is stopped even after initiating the discontinuation of the stopping of the internal combustion engine.

7. A control apparatus for an internal combustion engine comprising:
- a controller that:
  - executes a stop control for stopping the internal combustion engine when a predetermined engine stop condition is established, the stop control comprising an operation to stop a supply of fuel to the engine; and
  - executes a re-start control for re-starting the internal combustion engine when a predetermined engine re-start condition is established, the re-start control comprising an operation to resume the supply of fuel to the engine, wherein the controller discontinues the stop control for stopping the engine when the predetermined engine re-start condition is established during a predetermined period between establishment of the predetermined engine stop condition and stoppage of the internal combustion engine and the predetermined period is a period until preparation for stopping the internal combustion engine by adjusting an engine operation is completed.

8. The control apparatus according to claim 7, wherein the predetermined period is a period taken for decreasing an opening of a flow control valve at an intake side that is decreased before stopping the supply of the fuel to a predetermined opening degree.

9. The control apparatus according to claim 7, wherein the predetermined period is a period taken for decreasing a speed of the internal combustion engine to a predetermined engine speed after stopping of the supply of the fuel.

10. The control apparatus according to claim 9, wherein the controller re-starts the supply of fuel after increasing the opening of a flow control valve at an intake side that has been decreased before stopping the supply of fuel.

11. The control apparatus according to claim 10, wherein the controller re-starts the supply of fuel when a speed of the internal combustion engine at a time when the opening of the flow control valve at the intake side is increased to a predetermined opening degree becomes equal to or higher than a predetermined engine speed.

12. The control apparatus according to claim 8, wherein the controller re-starts the supply of fuel after increasing the opening of the flow control valve at the intake side that has been decreased before stop of the supply of fuel.

13. The control apparatus according to claim 9, wherein the controller re-starts the supply of fuel when a speed of the internal combustion engine at a time when the opening of the flow control valve at the intake side is increased to a predetermined opening degree becomes equal to or higher than a predetermined engine speed.

14. A method for controlling the stop and restart of an internal combustion engine comprising:
- stopping the internal combustion engine when a predetermined engine stop condition is established, the stopping of the engine including an operation to stop a supply of fuel to the engine;
- re-starting the internal combustion engine when a predetermined engine re-start condition is established, the re-starting of the engine including an operation to resume the supply of fuel to the engine; and
- discontinuing the stopping of the engine when the predetermined engine re-start condition is established during a predetermined period between establishment of the predetermined engine stop condition and stoppage of the internal combustion engine, wherein the predetermined period is a period until preparation for stopping the internal combustion engine by adjusting an engine operation is completed.

15. The method according to claim 14, wherein the predetermined period is a period taken for decreasing an opening of a flow control valve at an intake side that is decreased before stopping the supply of the fuel to a predetermined opening degree.

16. The method according to claim 14, wherein the predetermined period is a period taken for decreasing a speed of the internal combustion engine to a predetermined engine speed after stopping of the supply of the fuel.

17. The method according to claim 16, wherein the supply of fuel is re-started after increasing the opening of a flow control valve at an intake side that has been decreased before stopping the supply of fuel.

18. The method according to claim 17, wherein the supply of fuel is re-started when a speed of the internal combustion engine at a time when the opening of the flow control valve at the intake side is increased to a predetermined opening degree becomes equal to or higher than a predetermined engine speed.

19. The method according to claim 15, wherein the supply of fuel is re-started after increasing the opening of the flow control valve at the intake side that has been decreased before stop of the supply of fuel.

20. The method according to claim 16, wherein the supply of fuel is re-started when a speed of the internal combustion engine at a time when the opening of the flow control valve at the intake side is increased to a predetermined opening degree becomes equal to or higher than a predetermined engine speed.

21. A control apparatus for an internal combustion engine comprising:
- a controller that:
  - executes a stop control for stopping the internal combustion engine when a predetermined engine stop condition is established, the stop control comprising an operation to stop a supply of fuel to the engine; and executes a re-start control for re-starting the internal combustion engine when a predetermined engine re-start condition is established, the re-start control comprising an operation to resume the supply of fuel to the engine, wherein the controller discontinues the stop control for stopping the engine when the predetermined engine re-start condition is established during a predetermined period between establishment of the predetermined engine stop condition and stoppage of the internal combustion engine and the predetermined period is a period taken for decreasing a speed of the internal combustion engine to a predetermined engine speed after stopping of the supply of the fuel.

22. The control apparatus according to claim 21, wherein the controller re-starts the supply of fuel after increasing the opening of a flow control valve at an intake side that has been decreased before stopping the supply of fuel.

23. The control apparatus according to claim 22, wherein the controller re-starts the supply of fuel when a speed of the internal combustion engine at a time when the opening of the flow control valve at the intake side is increased to a predetermined opening degree becomes equal to or higher than a predetermined engine speed.

24. The control apparatus according to claim 21, wherein the controller re-starts the supply of fuel when a speed of the internal combustion engine at a time when the opening of the flow control valve at the intake side is increased to a predetermined opening degree becomes equal to or higher than a predetermined engine speed.

25. A method for controlling the stop and restart of an internal combustion engine comprising:

stopping the internal combustion engine when a predetermined engine stop condition is established, the stopping of the engine including an operation to stop a supply of fuel to the engine;

re-starting the internal combustion engine when a predetermined engine re-start condition is established, the re-starting of the engine including an operation to resume the supply of fuel to the engine; and discontinuing the stopping of the engine when the predetermined engine re-start condition is established during a predetermined period between establishment of the predetermined engine stop condition and stoppage of the internal combust engine, wherein the predetermined period is a period taken for decreasing a speed of the internal combustion engine to a predetermined engine speed after stopping of the supply of the fuel.

26. The method according to claim 25, wherein the supply of fuel is re-started after increasing the opening of a flow control valve at an intake side that has been decreased before stopping the supply of fuel.

27. The method according to claim 26, wherein the supply of fuel is re-started when a speed of the internal combustion engine at a time when the opening of the flow control valve at the intake side is increased to a predetermined opening degree becomes equal to or higher than a predetermined engine speed.

28. The method according to claim 25, wherein the supply of fuel is re-started when a speed of the internal combustion engine at a time when the opening of the flow control valve at the intake side is increased to a predetermined opening degree becomes equal to or higher than a predetermined engine speed.

* * * * *